United States Patent
Grabaum

(10) Patent No.: US 7,121,632 B2
(45) Date of Patent: Oct. 17, 2006

(54) SHAFT AND WHEEL HUB RETENTION ASSEMBLY

(75) Inventor: Gary Grabaum, Rochester Hills, MI (US)

(73) Assignee: GKN Driveline North Amercia, Inc., Auburn Hills, MI (US)

( * ) Notice: Subject to any disclaimer, the term of this patent is extended or adjusted under 35 U.S.C. 154(b) by 167 days.

(21) Appl. No.: 10/840,211

(22) Filed: May 5, 2004

(65) Prior Publication Data

US 2005/0248213 A1    Nov. 10, 2005

(51) Int. Cl.
F16C 13/00    (2006.01)
F16C 35/00    (2006.01)

(52) U.S. Cl. .................. 301/105.1; 384/544; 384/561; 384/903; 464/178

(58) Field of Classification Search ............. 301/105.1, 301/124.1, 126, 125; 180/258, 259; 384/539, 384/544, 561, 589, 903; 464/178, 906
See application file for complete search history.

(56) References Cited

U.S. PATENT DOCUMENTS

| | | | | |
|---|---|---|---|---|
| 2,145,089 A | * | 1/1939 | Kysor | 180/259 |
| 2,264,785 A | * | 12/1941 | Ash | 180/24 |
| 4,787,758 A | * | 11/1988 | Jacob | 384/559 |
| 4,881,842 A | * | 11/1989 | Farrell et al. | 403/19 |
| 5,226,737 A | * | 7/1993 | Sandy, Jr. | 384/512 |
| 5,492,417 A | * | 2/1996 | Baker et al. | 384/448 |
| 5,536,075 A | * | 7/1996 | Bertetti | 301/105.1 |
| 5,720,530 A | * | 2/1998 | Holsnijders et al. | 301/105.1 |
| 6,135,571 A | * | 10/2000 | Mizukoshi et al. | 301/105.1 |
| 6,315,457 B1 | * | 11/2001 | Kapaan et al. | 384/544 |
| 6,318,533 B1 | * | 11/2001 | Krisher | 192/69.41 |
| 6,450,585 B1 | * | 9/2002 | Kochsiek | 301/124.1 |
| 6,485,188 B1 | * | 11/2002 | Dougherty | 384/589 |
| 6,491,440 B1 | * | 12/2002 | Sahashi et al. | 384/544 |
| 6,497,515 B1 | * | 12/2002 | Sahashi et al. | 384/544 |
| 6,588,935 B1 | * | 7/2003 | Tajima et al. | 384/544 |
| 6,749,517 B1 | * | 6/2004 | Ouchi | 464/178 |
| 6,821,208 B1 | * | 11/2004 | Krude et al. | 464/178 |
| 6,851,865 B1 | * | 2/2005 | Nomura et al. | 384/544 |
| 2001/0016520 A1 | * | 8/2001 | Sahashi et al. | 464/182 |
| 2002/0044706 A1 | * | 4/2002 | Kayama et al. | 384/544 |
| 2003/0048966 A1 | * | 3/2003 | Nomura et al. | 384/544 |
| 2003/0048967 A1 | * | 3/2003 | Sahashi et al. | 384/544 |
| 2003/0189374 A1 | * | 10/2003 | Hahn | 301/105.1 |
| 2004/0022468 A1 | * | 2/2004 | Nomura et al. | 384/544 |
| 2004/0076356 A1 | * | 4/2004 | Kapaan et al. | 384/544 |
| 2004/0252926 A1 | * | 12/2004 | Tajima | 384/544 |
| 2005/0159227 A1 | * | 7/2005 | Ouchi et al. | 464/178 |

* cited by examiner

*Primary Examiner*—Russell D. Stormer
(74) *Attorney, Agent, or Firm*—Jennifer M. Brumbaugh; Mick A. Nylander

(57) ABSTRACT

An assembly having a retaining element, an outer race of a constant velocity joint, and a shaft of an outboard drive axle that is axially joined to the outer race. The shaft has an external groove circumferentially formed on its external surface for receiving the retaining element. The external surface of the shaft supports a new generation wheel bearing assembly and a wheel hub that is non-rotatably coupled to the external surface of the shaft. The retaining element engages the external groove of the shaft and retains the wheel hub without requiring a preload on the bearing. The wheel hub is held in place by the retaining element and the shaft, wherein the wheel bearing assembly is retained by the wheel hub, thereby allowing the retained wheel hub to be rotatably drivable within the wheel bearing assembly by the constant velocity joint.

15 Claims, 3 Drawing Sheets

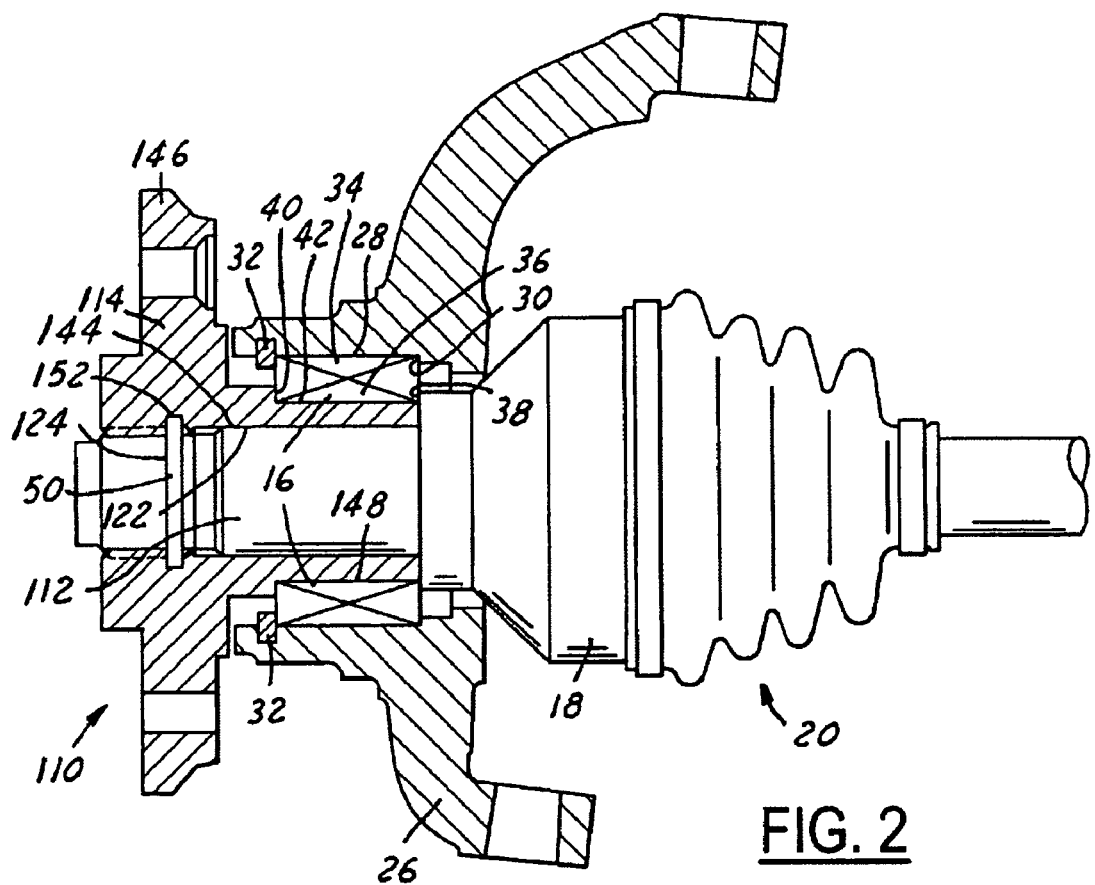
FIG. 2
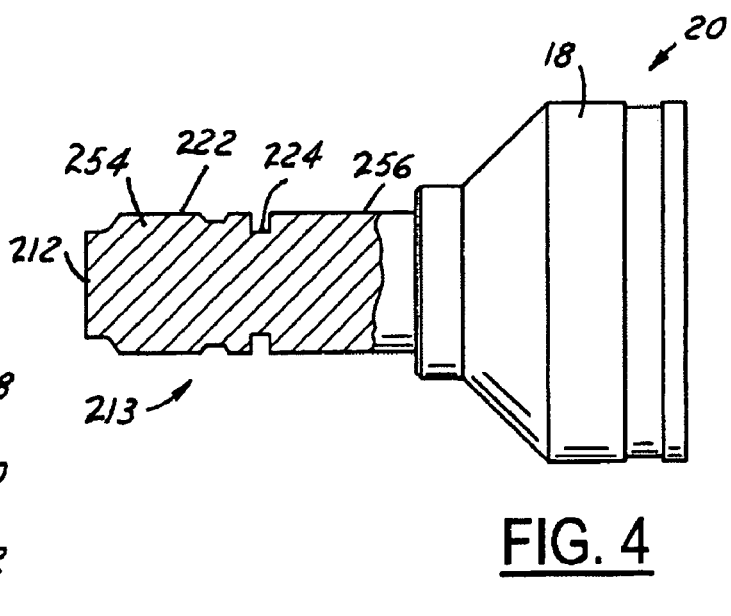
FIG. 4
FIG. 5

SHAFT AND WHEEL HUB RETENTION ASSEMBLY

TECHNICAL FIELD

This invention relates generally to the retaining against relative axial movement of two members in telescopic relation with a shaft. The members are retained by a retaining element received in an external groove on the shaft. In particular, the invention relates to a retaining element for retaining a wheel hub and a wheel bearing assembly, without preload upon a shaft of an outboard drive axle of an automotive vehicle.

BACKGROUND OF THE INVENTION

Driving and non-driving hub and wheel bearing assemblies of an automotive vehicle require a preload to be imparted upon the wheel bearings in order to align and retain the hub and wheel bearings. The preload is accomplished by using an axle washer that is forced against a wheel hub by an axle nut. The axle nut has internal threads that engage the external threads of a shaft of an outboard drive axle. The shaft is axially coupled to an outer race of a constant velocity joint. A wheel bearing assembly typically includes an outer bearing race and two separable inner races rotatably coupled by two sets of bearings, each set of bearings being thrust against the outer bearing race by its inner race. The outer bearing race is fixedly attached to a vehicle's frame, for example the bearing support or steering knuckle of a motor vehicle. The inside inner race is supported against the outer race of the constant velocity joint axially coupled to the shaft. The outside inner race is supported against the wheel hub and is axially coupled to the shaft or the wheel hub. The wheel hub transfers the preload force through the outside inner race into the bearings and outer bearing race. The preload force is opposed in the opposite direction by the outer race of the constant velocity joint through the inside inner race into the bearings and outer bearing race thus supporting and aligning the hub and wheel bearings when a preload is applied by the axle nut.

The preload may also be applied by using a wedge or spacer that fills a gap on the end shaft when the hub is preloaded against the bearing assemblies and the wedge or spacer is fit into the gap to maintain the preload. Other methods have also been employed for obtaining the pre load on the hub and bearing assembly, such as using a head of a bolt that is threaded into the axial end of the shaft and torqued against the axle washer or hub.

To insure that the preload is maintained, the axle nut is assembled with a lock nut, cotter pin or other similar methods known for securing nuts onto rotating shafts. A method of securing the preload typically requires a threaded shaft having a hole drilled radially within, an axle nut with corrugated recesses, an axle washer and locking pin. The locking pin engages the corrugated recess of the axle nut and is inserted into the hole of the threaded shaft locking the axle nut to the shaft. Alignment typically is required in order to install the locking pin and the locking pin is only attachable in incremental steps. In order to attach the locking pin it is sometime necessary to either increase or decrease the preload by adjusting the axle nut upon the shaft. This results in varying inconsistencies in the preload of each bearing assembly.

The preload is imparted during assembly of the wheel hub and wheel bearings onto the shaft. Using a torque wrench or other torque device, the axle nut is threaded onto the shaft against the assembly until a given torque range is obtained. The axle nut, typically, is then rotated back relieving some of the torque and locked into place.

It would be advantageous to have a shaft that is not threaded and eliminates the need for an axle washer and axle nut, or bolt, while still being able to retain the hub and wheel bearing assembly. It would be of further advantage to have an assembly that requires no preload or no lock nut adjustment. Also, it would be of advantage to eliminate the torque assembly procedure.

SUMMARY OF THE INVENTION

The present invention provides an assembly having a retaining element, an outer race of a constant velocity joint and a shaft of an outboard drive axle axially coupled to the outer race, wherein the shaft has an external surface and an external groove circumferentially formed in the external surface allowing the retaining element to be engaged in the external groove of the shaft. The assembly may receive and retain a wheel hub and wheel bearings. The assembly imparts no preload when retaining the wheel hub or wheel bearings, thus eliminating the need for an axle washer, axle nut, lock nut or threaded shaft.

According to another aspect of the invention, an assembly having a retaining element, an outer race of a constant velocity joint, and a shaft of an outboard drive axle that Is axially joined to the outer race is provided. The shaft has an external groove circumferentially formed on its external surface for receiving the retaining element. The external surface of the shaft supports a wheel bearing assembly and a wheel hub that is non-rotatably coupled to the external surface of the shaft. The retaining element engages the external groove of the shaft and retains the wheel hub and bearing not requiring a preload. The wheel hub is assembled between the retaining element and the wheel bearing. In this arrangement the wheel bearing assembly is retained between the wheel hub and the outer race of the constant velocity joint, thereby allowing the retained wheel hub to be rotatably drivable within the wheel bearing assembly by the constant velocity joint.

The present invention also provides an arrangement in which the spring ring may be engageably connected to the half shaft and may allow easy assembly and disassembly of the parts in situ on a vehicle.

One aspect of the invention provides a method of securing together, by means of retaining element, a wheel hub and a wheel bearing assembly in telescopic relationship with a shaft of an outboard drive axle axially coupled to an outer race of a constant velocity joint, wherein the shaft has an external surface and an external groove circumferentially formed in the external surface of the shaft, the wheel bearing assembly having a second bore, the wheel hub having a first bore and a radially extending flange. The method includes telescoping the shaft inwardly through the second bore of the wheel bearing assembly and the first bore of the wheel hub, retaining the wheel hub and the wheel bearing assembly on the shaft with engaged retaining element in the external groove of the shaft, and mounting the retaining element on the shaft.

Other advantages of the invention will become apparent upon reading the following detailed description and appended claims, and upon reference to the accompanying drawings.

BRIEF DESCRIPTION OF THE DRAWINGS

The invention will now be described in detail with reference to the accompanying drawings that show variations of a shaft of an outboard drive axle embodying the invention.

In the drawings:

FIG. 2 is a partial cross-section of a shaft, wheel hub and wheel bearings of an outboard drive axle assembly according to another embodiment of the invention.

FIG. 4 is a partial cross-section of a shaft of an outboard drive axle having internal retention capabilities according to one embodiment of the invention.

FIG. 5 is a block diagram showing the method of securing together a shaft of an outboard drive axle, a wheel hub and a wheel bearing assembly in accordance with the present invention.

DETAILED DESCRIPTION OF THE INVENTION

Figure 1:
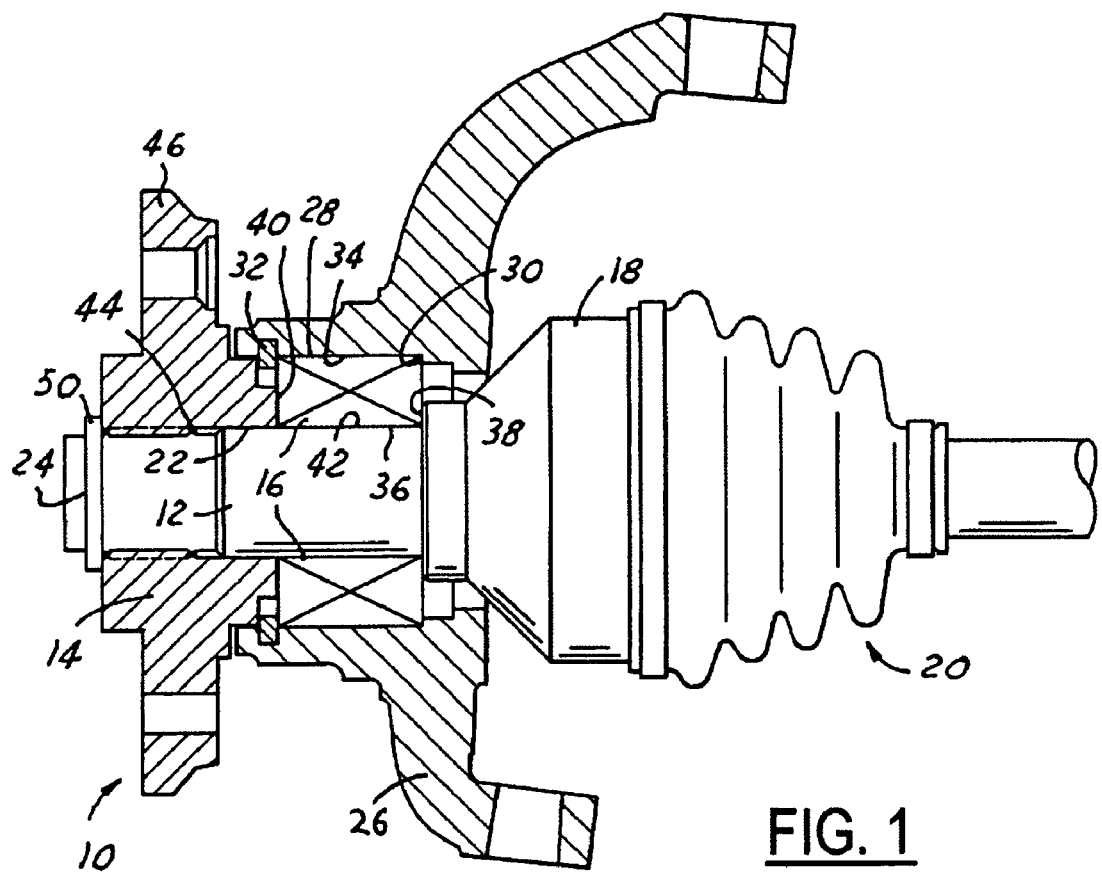
FIG. 1 is a partial cross-section of a shaft, wheel hub and wheel bearings of an outboard drive axle assembly according to one embodiment of the invention.

FIG. 1 is a partial cross-section of a shaft 12, wheel hub 14 and wheel bearings 16 of an outboard drive axle assembly 10 according to one embodiment of the invention. The assembly 10 comprises an outer race 18 of a constant velocity joint 20, a shaft 12 of an outboard drive axle 13 which is axially coupled to the outer race 18. The shaft 12 has an external surface 22 and an external groove 24 circumferentially formed in the external surface 22 of the shaft 12 for retaining the wheel hub 14.

The assembly 10 further comprises a steering knuckle or bearing support 26 having a third bore 28 and a backstop 30, a retaining ring 32 and a wheel bearing assembly 16. The wheel bearing assembly 16 is a type of wheel bearing known as roll-formed or self-contained bearing and does not require a preload. The wheel bearing assembly 16 has an outer part 34 rotatably coupled by a plurality of bearing elements (not shown) to an inner part 36, where the inner pad 36 has a second bore 42, a first side 38 and a second side 40 (all not detailed). The wheel bearing assembly 16 is fit into the third bore 28 up to the backstop 30 of the steering knuckle 26 and retained by the retaining ring 32 between the backstop 30 and the retaining ring 32. The outer part 34 of the wheel bearing assembly 16 is non-rotatably coupled to the third bore 28 of the steering knuckle 26. The inner part 36 of the wheel bearing assembly 16 is non-rotatably coupled to the shaft 12 of the outboard drive axle 13 where the first side 38 of the wheel bearing assembly 16 is assembled adjacent to the outer race 18.

The wheel hub 14 has a first bore 44 and a radially extending flange 46 for attaching a wheel. The assembly 10 also comprises a retaining element 50 for retaining the assembly without preload. The first bore 44 of the wheel hub 14 is coupled to the external surface 22 of the shaft 12 and is held in an assembled position between the second side 40 of the inner part 36 of the wheel bearing assembly 16 and the retaining element 50. The retaining element 50 engages the external groove 24 of the shaft 12 and retains the wheel hub 14. The retained wheel hub 14 is rotatably drivable within the steering knuckle 26 by the constant velocity joint 20.

The retaining element 50 of this embodiment is an external type of retaining device such as an external snap ring.

It is also contemplated that the external groove 24 may be located inwardly, nearer the outer race, upon the external surface in the coupling section of the shaft. The wheel hub having an internal groove circumferentially located within its inner bore. The wheel hub and the shaft may be held in an assembled position by the retaining element, which co-operatively engages the internal groove and the external groove. The retaining element 50 of this contemplated embodiment is an internal type of retaining device such as an internal snap ring.

FIG. 2 is a partial cross-section of a shaft 112, wheel hub 114, and wheel bearings 16 of an outboard drive axle assembly 110 according to another embodiment of the invention. The assembly 110 comprises an outer race 18 of a constant velocity joint 20, a shaft 112 of an outboard drive axle 13 which is axially coupled to the outer race 18. The shaft 112 has an external surface 122 and an external groove 124 circumferentlally formed in the external surface 122 of the shaft 112 for retaining the wheel hub 114.

The assembly 110 further comprises a steering knuckle or bearing support 26 having a third bore 28 and a backstop 30, a retaining ring 32 and a wheel bearing assembly 16. The wheel bearing assembly 16 is a type of wheel bearing known as roll-formed or self-contained bearing and does not .require a preload. The wheel bearing assembly 16 has an outer part 34 rotatably coupled by a plurality of bearing elements (not shown) to an inner part 36, where the inner part 36 has a second bore 42, a first side 38 and a second side 40 (all not detailed). The wheel bearing assembly 16 is fit into the third bore 28 up to the backstop 30 of the steering knuckle 26 and retained by the retaining ring 32 between the backstop 30 and the retaining ring 32. The outer part 34 of the wheel bearing assembly 16 is non-rotatably coupled to the third bore 28 of the steering knuckle 26.

The wheel hub 144 has an internal groove 152, a first bore 144, a radially extending flange 146 for attaching a wheel, and an outer surface 148. The inner part 36 of the wheel bearing assembly 16 is non-rotatably coupled to the outer surface 148 of the wheel hub 114. The first side 38 and second side 40 of the inner part 36 of the wheel bearing assembly 16 is assembled between the outer race 18 of the constant velocity joint 20 and the flange 146 of the wheel hub 114, respectfully.

The assembly 110 also comprises a retaining element 50 for retaining the assembly without preload. The first bore 144 of the wheel hub 114 is non-rotatably coupled to the external surface 122 of the shaft 112 and is held in an assembled position between the outer race 18 of the constant velocity joint 20 and the retaining element 50. The retaining element 50 engages cooperating grooves, the external groove 124 of the shaft 112 and the internal groove 152 of the wheel hub 114, retaining the wheel hub 114 to the shaft 112. The retained wheel hub 114 is rotatably drivable within the steering knuckle 26 by the constant velocity joint 20.

The retaining element 50 of this embodiment is an internal type of retaining device such as an internal snap ring.

It is also contemplated that the external groove 124 may be located outwardly, nearer the opposite end of the shaft from the outer race, upon the external surface in the coupling section of the shaft. The wheel hub and the shaft may be held in an assembled position by the retaining element. The retaining element 50 of this contemplated embodiment may be an external type of retaining device such as an external snap ring.

Figure 3:
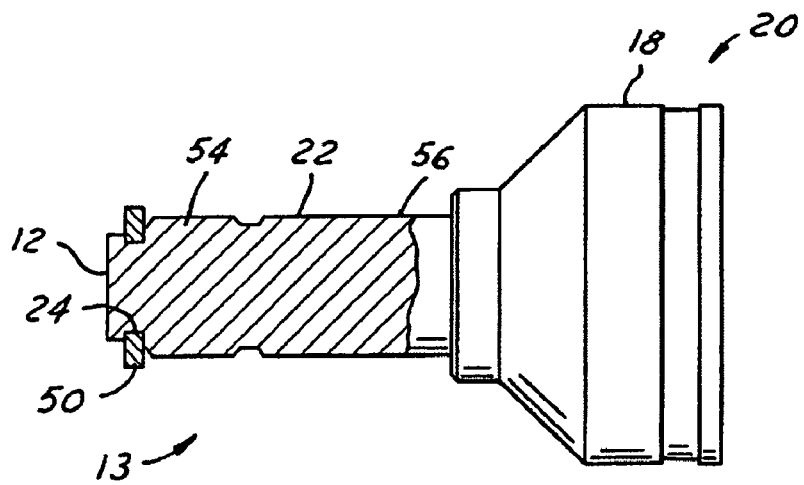
FIG. 3 is a partial cross-section of a shaft of an outboard drive axle having an external type of retaining element according to one embodiment of the invention.

FIG. 3 is a partial cross-section of a shaft 12 of an outboard drive axle 13 having an external type of retaining element 50 according to the embodiment shown in FIG. 1. The assembly of the outboard drive axle 13 includes an outer race 16 of a constant velocity joint 20 axially coupled to a shaft 12. The shaft 12 has an external surface 22 and an external groove 24 circumferentially formed in the engagement section 54 of the external surface 22. The assembly of the outboard drive axle 13 is shown here having a retaining element 50 assembled in the external groove 24 on the shaft 12.

The engagement section 54 of the shaft 12 may have a plurality of spline or other engagement surfaces known to one in the art for non-rotatably coupling or inter-engaging with another part.

FIG. 4 is a partial cross-section of a shaft 212 of an outboard drive axle 213 having internal retention capabilities according to one embodiment of the invention. The assembly of the outboard drive axle 213 includes an outer race 18 of a constant velocity joint 20 axially coupled to a shaft 212. The shaft 212 has an external surface 222 and an external groove 224 circumferentially formed in the non-engagement section 256 of the external surface 222.

The external groove 224 is capable of receiving a retaining element 50 that is either an external type or internal type of retention. An external retaining element 50 would include a spring ring or snap ring that expands in order to slip over the shaft 112 and retracts, when released, to engage the external groove 224 and may retain the wheel hub 214. An internal retaining element would include a spring ring or snap ring that is compressible within the external groove 224 and regains shape upon being released for co-operatively engaging the grooves 224, 152 of the shaft 212 and wheel hub 214 respectfully, as shown in FIG. 2. The retaining element 50 can be a snap ring and other compatible retention devices known to those in the art.

The engagement section 254 of the shaft 212 may have a plurality of spline or other engagement surfaces known to one in the art for non- rotatably coupling or inter-engaging with another part.

FIG. 5 is a block diagram showing the method of securing together a shaft of an outboard drive axle, a wheel hub and a wheel bearing assembly in accordance with the present invention. This embodiment provides an arrangement in which, when securing together the a shaft of an outboard drive axle, a wheel hub and a wheel bearing assembly by means of a spring ring, the spring ring can be engageably connected to the shaft and can thus allow easy assembly and disassembly of the parts in situ on a vehicle.

According to one aspect of the invention a method of securing together, by means of retaining element, a wheel hub and a wheel bearing assembly in telescopic relationship with a shaft of an outboard drive axle axially coupled to an outer race of a constant velocity joint is given, wherein the shaft has an external surface and an external groove circumferentially formed in the external surface of the shaft, the wheel bearing assembly having a second bore, the wheel hub having a first bore and a radially extending flange. The method includes telescoping 58 the shaft inwardly through the second bore of the wheel bearing assembly and the first bore of the wheel hub, retaining 60 the wheel hub and the wheel bearing assembly on the shaft with engaged retaining element in the external groove of said shaft, and mounting 62 the retaining element on the shaft.

The order of assembly is dependent upon the type of retaining element used, i.e. external or internal retention. The mounting of the retaining element on the shaft may be the first, intermediate or the last step of the method.

It is further contemplated that a step of compressing the retaining element may be included. The step requires compressing the retaining element within the external groove of the shaft while receiving in telescopic relationship the wheel hub onto the shaft.

Figure 6:
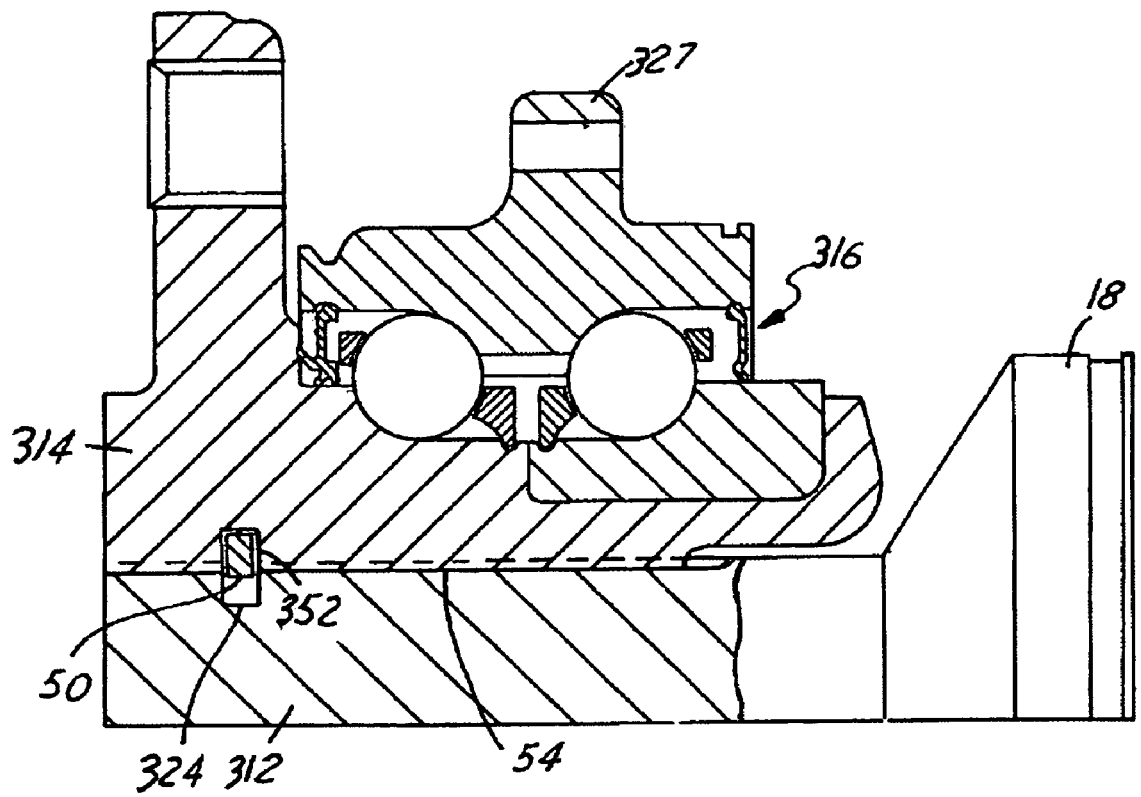
FIG. 6 is a partial cross-section of a shaft, wheel hub and wheel bearings of an outboard drive axle assembly according to another embodiment of the invention.

FIG. 6 is a partial cross-section of a shaft 312, wheel hub 314, and wheel bearings 316 of an outboard drive axle assembly according to another embodiment of the invention. The assembly has an outer race 18 of a constant velocity joint that is axially coupled to a shaft 312. The shaft 312 has an external groove 324 circumferentially formed in its external surface and is capable of receiving a retaining element 50. The wheel hub 314, has an internal groove 352 capable of receiving the retaining element 50 as shown in this embodiment. The assembly of this embodiment also shows a bearing support or steering knuckle 327 rotatably coupled by a wheel bearing assembly 316 to the wheel hub 314. The wheel bearing assembly 316 is a type of wheel bearings, known as roll-formed or self-contained bearing and does not require a preload. The retaining element 50 retains the assembly without imparting preload upon the bearings. The wheel hub 314 is non-rotatably coupled, e.g., splined, to the shaft 312 and held in an assembled position by the retaining element 50. The retaining element 50 engages cooperating grooves, the external groove 324 of the shaft 312 and the internal groove 352 of the wheel hub 314, retaining the wheel hub 314 to the shaft 312. The retained wheel hub 314 is rotatably drivable within the steering knuckle 327 by the constant velocity joint.

The retaining element 50 of this embodiment is an internal type of retaining device such as an internal snap ring. It is also contemplated that the external groove 324 may be located outwardly, nearer the opposite end of the shaft from the outer race, upon the external surface in the coupling section of the shaft, wherein the wheel hub and the shaft may be held in an assembled position by the retaining element. The retaining element 50 of this contemplated embodiment may be an external type of retaining device such as an external snap ring.

From the foregoing, it can be seen that there has been brought to the art a new and improved assembly and method of retaining a wheel hub and wheel bearing upon a shaft by a retaining element which has advantages over prior designs. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An assembly, comprising:
    an outer race of a constant velocity joint;
    a shaft of an outboard drive axle axially coupled to said outer race, wherein said shaft has an external surface and an external groove circumferentially formed in said external surface of said shaft;
    a retaining element;
    a wheel hub having a first bore and an internal groove circumferentially formed in said first bore for receiving said retaining element, wherein said first bore of said wheel hub telescopingly receives said external surface of said shaft; and a bearing assembly telescopingly received on one of said shaft on said wheel hub, wherein said retaining element releasably engages said external groove of said shaft and said internal groove of said wheel hub to axially secure said wheel hub and shaft in both axial directions and imparts no pre-load on said bearing assembly.

2. The assembly of claim 1, wherein said retaining element is compressively retractable within said external groove of said shaft, and wherein said retaining element and said shaft are telescopingly received in a second bore of said bearing assembly and in said first bore of said wheel hub.

3. The assembly of claim 1, wherein said retaining element is compressively retractable within said external groove of said shaft, and wherein said retaining element and said shaft are telescopingly received in said first bore of said wheel hub.

4. The assembly according to claim 1, wherein said external surface of said shaft has external splines axially engaging internal splines on said first bore of said wheel hub.

5. The assembly according to claim 1, wherein said retaining element is a spring ring.

6. The assembly of claim 1 wherein said wheel hub having an outer surface and a radially extending flange, telescopingly receives a second bore of said bearing assembly on said outer surface and retains said bearing assembly between said outer race and said radially extending flange of said wheel hub.

7. The assembly according to claim 6, wherein said first bore of said wheel hub and said external surface of said shaft have inter-engaging splines.

8. The assembly according to claim 6 further comprising a retaining ring and a steering knuckle having a third bore and a backstop, said steering knuckle telescopingly receiving said bearing assembly in said third bore and retaining said bearing assembly between said backstop and said retaining ring.

9. The assembly of claim 1 wherein said bearing assembly comprises a second bore, a first side and a second side, said second bore being telescopically received on said shaft, wherein said first side is adjacent said outer race, and said second side is adjacent said wheel hub.

10. The assembly according to claim 9, wherein said first bore of said wheel hub and said external surface of said shaft have inter-engaging splines.

11. The assembly according to claim 9 further comprising a retaining ring and a steering knuckle having a third bore and a backstop, said steering knuckle telescopingly receiving said bearing assembly in said third bore and retaining said bearing assembly between said backstop and said retaining ring.

12. An assembly, comprising:
an outer race of a constant velocity joint;
a shaft of an outboard drive axle axially coupled to said outer race, wherein said shaft has an external surface and an external groove circumferentially formed in the external surface of said shaft;
a steering knuckle having a third bore and a backstop;
a retaining ring;
a wheel bearing assembly and comprising an outer part rotatably coupled by a plurality of bearing elements to an inner part, wherein the inner part has a second bore, a first side and a second side, wherein the outer part of said wheel bearing assembly is fit into the third bore up to the backstop of said steering knuckle and retained by said retaining ring opposite the backstop, the inner part of the wheel bearing assembly is coupled to said shaft and the first side is adjacent to said outer race;
a retaining element; and
a wheel hub having a first bore with an internal agroove, and a radially extending flange, wherein the first bore of said wheel hub is coupled to the external surface of said shaft and held in an assembled position between the second side of the inner part of said wheel bearing assembly and said retaining element, wherein said retaining element is engaged in the internal and the external grooves to axially secure the wheel hub and shaft in both axial directions and imparts no pre-load on said wheel bearing assembly, and wherein the wheel hub is rotatably drivable within the steering knuckle by the constant velocity joint.

13. The assembly according to claim 12, wherein the first bore of said wheel hub and the external surface of said shaft have inter-engaging splines.

14. In an assembly comprising an outer race of a constant velocity joint, a shaft of an outboard drive axle axially coupled to said outer race, wherein said shaft has an external surface and an external groove circumferentially formed in the external surface of said shaft, and a wheel bearing assembly having a second bore with an internal groove, a retaining element, and a wheel hub having a first bore and a radially extending flange, a method of retaining said wheel hub and said wheel bearing in telescopic relationship with said shaft by said retaining element comprising:

telescoping said shaft inwardly through the second bore of said wheel bearing assembly and the first bore of said wheel hub;

retaining said wheel hub and said wheel bearing assembly on said shaft with an engaged retaining element in the internal and the external grooves to axially secure the wheel hub and shaft in both axial directions while imparting no pre-load on said wheel bearing assembly; and mounting said retaining element on said shaft.

15. The method of claim 14, further comprising compressing said retaining element within said external groove of said shaft while receiving in telescopic relationship said wheel hub onto said shaft.

* * * * *